(12) United States Patent
Lucas et al.

(10) Patent No.: US 9,132,588 B2
(45) Date of Patent: Sep. 15, 2015

(54) PRODUCING AN ITEM BY THE SELECTIVE FUSION OF POLYMER POWDER LAYERS

(75) Inventors: Pierre-Emmanuel Lucas, Couzon (FR); Cécile Corriol, Lyons (FR)

(73) Assignee: RHODIA OPERATIONS, Aubervilliers (FR)

( * ) Notice: Subject to any disclaimer, the term of this patent is extended or adjusted under 35 U.S.C. 154(b) by 1011 days.

(21) Appl. No.: 13/132,212

(22) PCT Filed: Dec. 1, 2009

(86) PCT No.: PCT/EP2009/066103
§ 371 (c)(1),
(2), (4) Date: Jul. 29, 2011

(87) PCT Pub. No.: WO2010/063691
PCT Pub. Date: Jun. 10, 2010

(65) Prior Publication Data
US 2011/0293918 A1      Dec. 1, 2011

(30) Foreign Application Priority Data
Dec. 1, 2008  (FR) ..................................... 08 06730

(51) Int. Cl.
*B27N 3/00* (2006.01)
*B29C 67/00* (2006.01)
*B29K 101/12* (2006.01)

(52) U.S. Cl.
CPC ......... B29C 67/0077 (2013.01); *B29K 2101/12* (2013.01); *Y10T 428/249981* (2015.04)

(58) Field of Classification Search
CPC .................................................. B29C 67/0077
USPC .......................................................... 264/5, 7
See application file for complete search history.

(56) References Cited

U.S. PATENT DOCUMENTS

| | | | | | |
|---|---|---|---|---|---|
| 4,946,808 | A | * | 8/1990 | Wei et al. | 501/95.3 |
| 5,817,206 | A | * | 10/1998 | McAlea et al. | 156/272.8 |
| 6,136,948 | A | * | 10/2000 | Dickens et al. | 528/323 |
| 2007/0132158 | A1 | * | 6/2007 | Martinoni et al. | 264/497 |
| 2009/0304757 | A1 | * | 12/2009 | Herve et al. | 424/401 |

FOREIGN PATENT DOCUMENTS

| EP | 1460108 A | 9/2004 |
|---|---|---|
| FR | 2907366 A | 4/2008 |
| WO | WO 2008006782 A1 * | 1/2008 |

OTHER PUBLICATIONS

International Search Report dated Jul. 19, 2010 issued in International Application No. PCT/EP2009/066103.

* cited by examiner

*Primary Examiner* — Galen Hauth
(74) *Attorney, Agent, or Firm* — Dentons US LLP

(57) ABSTRACT

A method for manufacturing items by the selective fusion of polymer powder layers, particularly rapid prototyping by solid phase sintering a thermoplastic polymer powder by means of a laser, having characteristics of grading and particle distribution is described. Items obtained from such a method are also described.

14 Claims, No Drawings

PRODUCING AN ITEM BY THE SELECTIVE FUSION OF POLYMER POWDER LAYERS

This application is the United States national phase of PCT/EP2009/066103, filed Dec. 1, 2009, and designating the United States (published in the French language on Jun. 10, 2010, as WO 20101063691 A1; the title and abstract were also published in French), which claims foreign priority under 35 U.S.C. §119 of FR 0806730, filed Dec. 1, 2008, each hereby expressly incorporated by reference in its entirety and each assigned to the assignee hereof.

The present invention relates to a method for manufacturing articles by selective fusion of polymer powder layers, in particular by rapid prototyping by solid phase sintering, using a laser, of a powder based on thermoplastic polymers, and having particular particle size and distribution characteristics. The invention also relates to the articles obtained by such a method.

Sintering is a method for obtaining parts of complex shape without tools and without machining, from a three-dimensional image of the article to be produced, by sintering superimposed layers of polymeric powders, in particular using a laser. Thermoplastic polymers are generally used for this purpose. General information about rapid prototyping by laser sintering is provided in U.S. Pat. No. 6,136,948 and applications WO96/06881 and US20040138363.

In order to produce polyamide articles by sintering, it is known practice to use nylon 12 powders having a d50 particle size distribution between 50 and 150 μm. These powders have similar-size particles and therefore a narrow particle size distribution. It appears that the use of these particles leads to the manufacture of articles by a method of rapid prototyping by solid phase sintering, using a laser, said articles having a heterogeneity of mechanical properties throughout the article and inadequate surface appearance.

A need therefore existed to remedy these drawbacks.

The applicant has surprisingly discovered that the use of thermoplastic polymer powders having specific particle size distribution, sphericity and intraparticle porosity characteristics, is suitable for producing articles by selective fusion of polymer powder layers, in particular by rapid prototyping using a laser, said articles having a high density and high uniformity of mechanical properties. Furthermore, these articles have a good surface appearance. The use of these particular powders even allows the production of articles by sintering a polyamide not used so far, in particular nylon 6 or 6-6.

The present invention therefore firstly relates to a method for manufacturing an article by selective fusion of thermoplastic polymer powder layers, having the following characteristics:

- a d50 particle size distribution of between 20 and 100 μm, preferably between 30 and 70 μm, and also satisfying the following equation: (d90−d10)/d50 between 0.85 and 1.2;
- a sphericity factor of between 0.8 and 1, preferably between 0.85 and 1; and
- an intraparticle porosity lower than 0.05 ml/g, preferably lower than 0.02 ml/g.

The invention also relates to a manufactured article that can be obtained by the abovementioned method.

Powder means an assembly of powder particles obtained by the method described above.

The particle size distribution of the objects is obtained by laser diffraction measurement on a Malvern granulometer, using a wet module. The quantities used in this document concern d10, d50 and d90. The d10 mesh is the dimension such that 10% of the particles are smaller than this dimension and 90% of the particles are larger than this dimension. The d50 mesh is the dimension such that 50% of the particles are smaller than this dimension and 50% of the particles are larger than this dimension. The d90 mesh is the dimension such that 90% of the particles are smaller than this dimension and 10% of the particles are larger than this dimension. The coefficient of variation quantifying the extent of the distribution will be defined such that:

$$CV = \frac{(d90 - d10)}{d50}$$

The laser diffraction particle size analysis is carried out as described in standard AFNOR ISO 13320-1.

The sphericity factor is measured as follows: To quantify the sphericity of the objects, use is made of image analysis in the following manner. The characteristic wavelengths of the small and large diameters for each object are measured on at least 100 objects. For each object, the sphericity factor is defined as the ratio of the small diameter to the large diameter. For a perfect sphere, the ratio is 1. For grains of variable morphology, this ratio is lower than and tends toward 1 when approaching perfect sphericity. On 100 objects sampled, the sphericity factor is calculated from the ratio of the diameters, and the mean sphericity factor is then calculated. To do this, in a manner known per se, the sample of particles is dispersed on a glass slide placed under an optical microscope and the characteristic lengths are recorded in succession.

Thus, according to the invention, the particles are essentially spherical.

The intraparticle porosity is measured as follows: The porous texture of the objects is determined by mercury porosimetry using an Autopore IV instrument from Micromeritics. This method is based on the intrusion of mercury into the intergranular and intragranular pore network. This intrusion is managed via a pressure increase. The range of pressures (P) used is 0.003 MPa to 400 MPa. Using the Washburn equation, the pore diameter (2r) is easily related to the pressure applied:

$$r = (-)\frac{2 \cdot \gamma_{LV} \cdot \cos\Theta}{P}$$

The parameters considered for mercury are respectively: $485.10^{-5}$ N/cm for the surface tension $\gamma_{LV}$ and 130° for the wetting angle $\Theta$. The results are presented as the volume of mercury introduced per gram of sample as a function of pressure applied, hence of the pore diameter. The intraparticle porosity corresponds to the intrusion of mercury into pores of a particle which are smaller than 0.1 μm. Mercury porosimetry is a technical concept that is well known to a person skilled in the art; for further details, reference can be made in particular to the article: Gomez F., Denoyel R., Rouquerol J., Langmuir, 16, 3474 (2000).

Mercury porosimetry also serves to obtain the values of specific surface area by considering that the pores are cylindrical, using the following equation:

$$A = -\frac{PV}{\gamma \cos\Theta}$$

where A and V are the area and volume of the pores respectively, and P is the pressure applied. Further details are given in the article: Washburn E. W., Proc. Nat. Acad. Sci., 7, 115-6 (1921). It has been checked mathematically (see the Micromeritic technical document) that the specific surface area calculated from the work to be provided to immerse a surface in mercury is identical to that in which the calculation considers that the pores are cylindrical. Further details on the calculation of the work required for the immersion of a surface in mercury are given in the article: Rootare H. M., Prenzlow C. F, J. Phys. Chem., 71, 2733-6 (1967).

The powder of the invention has an intraparticle porosity lower than 0.05 ml/g, for pore sizes between 0.01 µm and 1 µm.

The flowability of the powders is measured by shearing a sample by the ring shear tester (sold by D. Schulze, Germany). The powders are pre-sheared on a cell having an area of 81 cm² with a normal stress equivalent to a mass of 4.3 kg. The shear points for tracing the flow location of the sample are obtained for four stresses lower than the pre-shearing stress, typically for stresses equivalent in mass to 0.4, 0.7-1.7, 2.5 kg. Based on these Mohr circles, in a diagram of shear stress as a function of normal stresses, two stresses are obtained at the flow location; one is the end of the large Mohr circle which passes through the shear point and is called the normal stress in the main direction, and the other is the end of the small Mohr circle, a circle tangent to the flow location and passing through the origin, which is called the cohesion force. The ratio of the normal stress in the main direction to the cohesion force is a dimensionless number, the flowability index. According to the Jenike scale, it is possible to class the flowability of powders as a function of the values of the index:

| | |
|---|---|
| i < 2 | Very cohesive product, does not flow |
| 2 < i < 4 | Cohesive product |
| 4 < i < 10 | Easily flowing product |
| i > 10 | Free-flowing product |

Powder flowability is a technical concept which is also well known to a person skilled in the art; for further details, reference can be made in particular to the work: "Standard shear testing technique for particulate solids using the Jenike shear cell", published by "The institution of Chemical Engineers", 1989 (ISBN: 0852952325).

The packed density is measured as follows: powder is poured into a 250 ml glass graduated cylinder, previously weighed. The top of the cylinder is leveled. The weighed cylinder is placed on the volumenometer and the level of the powder bed is read on the graduation of the cylinder after 2048 strokes. The packed density is obtained using the following equation:

$$d = \frac{\text{mass (kg)}}{\text{volume read (m}^3\text{)}}$$

The test conforms to the one reported in the text of the European pharmacopoeia, 1997.

The powder of the invention can be obtained in various ways known to a person skilled in the art, according to the materials used. Mention can be made in particular, for example, of the documents EP1797141 and WO2007/115977.

Said powder can in particular be manufactured by:
a) mixing a molten thermoplastic polymer with a compound A consisting of a polymeric material whereof at least part of the structure is compatible with said thermoplastic polymer and at least part of the structure is incompatible and insoluble in said thermoplastic polymer, for obtaining a dispersion of discrete particles of thermoplastic polymer;
b) cooling said mixture to a temperature lower than the softening point of the thermoplastic polymer,
c) treating said cooled mixture to make the particles of thermoplastic polymer disintegrate.

The formation of the mixture is obtained in particular by fusion of the thermoplastic polymer and addition of compound A in solid or molten form, and the application of a mixing energy to obtain the formation of discrete particles of thermoplastic polymer dispersed in an advantageously continuous phase formed by the compound A. This mixture can also be obtained by the solid state mixing of particles of said thermoplastic polymer with particles of said additive A, and fusion of the mixture of particles with the application of a mixing energy to the molten mixture to obtain the formation of discrete particles of thermoplastic polymer dispersed in an advantageously continuous phase formed by the compound A.

The weight concentration of additive A in the mixture may be between 10% and 50%, advantageously between 20% and 30%.

More generally, the mixture can be obtained by any suitable device such as endless screw mixers or stirrers compatible with the temperature and pressure conditions employed for the use of thermoplastic materials.

According to a preferred embodiment of the invention, the molten mixture is shaped before the cooling step, for example into filaments or strings. This shaping can be carried out advantageously by extrusion through a die.

According to a preferred embodiment of the invention, in particular when the molten mixture is shaped, said molten mixture is preferably made in an extruder feeding the extrusion die.

The molten mixture can be cooled by any suitable means. Among them, air cooling or dipping in a liquid are preferred.

The step of recovering the thermoplastic polymer powder advantageously consists in disintegrating the discrete particles of thermoplastic polymer. This disintegration can be obtained by applying a shear force to the cooled mixture. The disintegration of the thermoplastic polymer particles can also be obtained by dipping the cooled molten mixture in a liquid which is not a solvent of thermoplastic polymer and is advantageously a solvent of additive A.

As thermoplastic polymers, mention can be made of polyolefins, in particular polyethylene and polypropylene, polyvinyl chlorides, polyethylene terephthalates, polystyrenes, polyamides, acrylics. Semi-crystalline and thermoplastic polymers are particularly preferred.

Polyamide is particularly preferred.

Any polyamide known to a person skilled in the art can be used in the context of the invention. The polyamide is generally a polyamide of the type obtained by polycondensation from carboxylic diacids and diamines, or the type obtained by polycondensation of lactams and/or amino acids. The polyamide of the invention may be a mixture of polyamides of various types and/or of the same type, and/or of copolymers obtained from various monomers corresponding to the same type and/or to different types of polyamide.

As an example of a polyamide that may be suitable for the invention, mention can be made of nylon 6, nylon 6-6, nylon 11, nylon 12, nylons 4-6, 6-10, 6-12, 12-12, 6-36; semi-aromatic polyamides, for example polyphthalamides obtained from terephthalic and/or isophthalic acid, such as the polyamide sold by the trade name AMODEL, and copolymers and alloys thereof. According to a preferred embodiment of the invention, the polyamide is selected from nylon 6, nylon 6-6, and mixtures and copolymers thereof. The polyamide may also be a polymer comprising such star macromolecular chains, like those described in documents FR2743077, FR2779730, U.S. Pat. No. 5,959,069, EP632703, EP682057 and EP832149. These compounds are known to have improved fluidity compared to linear polyamides having the same molecular weight.

Additive A is advantageously a block, sequenced, comb, hyperbranched or star polymer. Thus, the structure compatible with the polyamide forms a block, a sequence, a skeleton or the teeth of the comb, the core or the branches of the star polymer or the hyperbranched polymer.

According to a preferred embodiment of the invention, the structure compatible with additive A comprises functions that are chemically identical to those of the polyamide.

According to the preferred embodiment of the invention, additive A is selected from the group consisting of a polymer D defined below or a hyperbranched polymer E preferably comprising at least one block of polyalkylene oxide.

Said polymer D is a polymer having thermoplastic properties comprising a block of thermoplastic polymer and at least one block of polyalkylene oxide such that:
- the block of thermoplastic polymer comprises a star or H macromolecular chain comprising at least one multifunctional core and at least one branch or a segment of thermoplastic polymer connected to the core, the core comprising at least three identical reactive functions
- the polyalkylene oxide block or blocks are connected to at least part of the free ends of the star or H macromolecular chain, selected from the ends of the branch or segment of thermoplastic polymer and the ends of the multifunctional core.

Such thermoplastic polymers and their method of preparation are described in particular in document WO 03/002668 incorporated by reference.

The star macromolecular chain of the polymer D is advantageously a star polyamide obtained by copolymerization from a mixture of monomers comprising:
a) a multifunctional compound comprising at least three identical reactive functions selected from the amine function and the carboxylic acid function
b) monomers having the following general formulae (IIa) and/or (IIb):

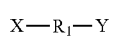  (IIa)

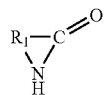  (IIb)

c) if applicable, monomers having the following general formula (III):

  (III)

where:
Z is a function identical to that of the reactive functions of the multifunctional compound
$R_1$, $R_2$ are aliphatic, cycloaliphatic or aromatic or arylaliphatic, substituted or unsubstituted, hydrocarbon radicals, identical or different, comprising 2 to 20 carbon atoms, and possibly comprising heteroatoms,
Y is a primary amine function when X is a carboxylic acid function, or
Y is a carboxylic acid function when X is a primary amine function.

The H macromolecular chain of the thermoplastic polymer block of polymer D is advantageously a polyamide H obtained by copolymerization from a mixture of monomers comprising:
a) a multifunctional compound comprising at least three identical reactive functions selected from the amine function and the carboxylic acid function
b) lactams and/or amino acids
c) a difunctional compound selected from dicarboxylic acids and diamines,
d) a monofunctional compound of which the function is either an amine function or a carboxylic acid function, the functions of c) and d) being amine when the functions of a) are acid, the functions of c) and d) being acid when the functions of a) are amine, the ratio in equivalents between the functional groups of a) and the sum of the functional groups of c) and d) being between 1.5 and 0.66, the ratio in equivalents between the functional groups of c) and the functional groups of d) being between 0.17 and 1.5.

Advantageously, the multifunctional compound of the star or H macromolecular chains is represented by the formula (IV)

  (IV)

where:
$R_1$ is a hydrocarbon radical comprising at least two linear or cyclic, aromatic or aliphatic carbon atoms, and possibly comprising heteroatoms,
A is a covalent bond or an aliphatic hydrocarbon radical comprising 1 to 6 carbon atoms,
Z is a primary amine radical or a carboxylic acid radical,
m is a whole number between 3 and 8.

The multifunctional compound is preferably selected from 2,2,6,6-tetra-(β-carboxyethyl)-cyclohexanone, trimesic acid, 2,4,6-tri-(aminocaproic acid)-1,3,5-triazine, 4-aminoethyl-1,8-octanediamine.

The polyalkylene oxide block POA of polymer D is preferably linear. It may be selected from polyethylene oxide, polytrimethylene oxide, polytetramethylene oxide blocks. In the case in which the block is based on polyethylene oxide, it may comprise propylene glycol motifs at the ends of the block. The polyalkylene oxide block of polymer D is preferably a polyethylene oxide block.

Advantageously, all the free ends of the macromolecular chain of the thermoplastic polymer block of polymer D are connected to a block of polyalkylene oxide.

According to the invention, E hyperbranched polymer means a branched polymeric structure obtained by polymerization in the presence of compounds having a functionality higher than 2, and whose structure is not perfectly controlled. These are often statistical copolymers. Hyperbranched polymers may, for example, be obtained by a reaction between, in particular, plurifunctional monomers, for example, trifunctional and bifunctional monomers, each of the monomers carrying at least two different reactive polymerization functions.

Advantageously, the E hyperbranched polymer of the invention is selected from polyesters, polyesteramides and hyperbranched polyamides.

The E hyperbranched polymer of the invention is preferably a hyperbranched copolyamide of the type obtained by reaction between:

at least one monomer having the following formula (I):

$$A\text{-}R\text{—}B_f \quad (I)$$

where A is a reactive polymerization function of a first type, B is a reactive polymerization function of a second type and capable of reacting with A, R is a hydrocarbon entity, and f is the total number of B reactive functions per monomer: $f \geq 2$, preferably $2 \leq f \leq 10$;

at least one monomer having the following formula (II):

$$A'\text{-}R'\text{—}B' \text{ or the corresponding lactams} \quad (II)$$

where A', B', R' have the same definition as the one given above respectively for A, B, R in formula (I), optionally at least one "core" monomer having the following formula (III) and/or at least one "chain-limiting" monomer having the following formula (IV):

$$R^1(B'')_n \quad (III)$$

where:
- $R^1$ is a hydrocarbon radical, substituted or unsubstituted, of the silicone, linear or branched alkyl, aromatic, arylalkyl, alkylaryl or cycloaliphatic type, which may comprise unsaturations and/or heteroatoms;
- B'' is a reactive function of the same type as B or B';
- $n \geq 1$, preferably $1 \leq n \leq 100$ $$R^2\text{-}A'' \quad (IV)$$

where:
- $R^2$ is a hydrocarbon radical, substituted or not, of the silicone, linear or branched alkyl, aromatic, arylalkyl, alkylaryl or cycloaliphatic type, which may comprise one or more unsaturations and/or one or more heteroatoms,
- and A'' is a reactive function of the same type as A or A', the molar ratio I/II being defined as follows:
$0.05 < I/II$
and preferably $0.125 \leq I/II \leq 2$;

at least one of the entities R or R' of at least one of the monomers (I) or (II) being aliphatic, cycloaliphatic or arylaliphatic, $R_1$ and/or $R_2$ being polyoxyalkylene radicals.

Such copolyamides are described in document WO0068298, incorporated by reference, in particular on page 11 lines 3 to 6.

The reactive polymerization functions A, B, A', B' are advantageously selected from the group comprising carboxylic functions and amines.

The monomer having formula (I) of the hyperbranched copolyamide is advantageously a compound in which A is the amine function, B the carboxylic function, R an aromatic radical and f=2.

$R_1$ and/or $R_2$ are advantageously polyoxyalkylene amine radicals of the Jeffamine® type.

As additive A, use is preferably made of compounds selected from the group comprising ethylene oxide-propylene oxide block copolymers (Pluronic® and Synperonic®), and polyalkylene amines (Jeffamine®).

In addition to the thermoplastic polymer and the additive A, the composition may comprise other compounds.

In an embodiment of the invention, additive A is used in combination with a compound B which is insoluble and incompatible with the thermoplastic polymer. Advantageously, this compound B has a chemical structure compatible with at least part of the structure of compound A, in particular the part of the structure incompatible with the thermoplastic polymer. As an example of compounds B suitable for the invention, mention can be made of compounds belonging to the families of polysaccharides, polyoxyalkyleneglycols, polyolefins. Compound B may be added separately from compound A or in a mixture with at least part of compound A. It may also be premixed with the thermoplastic polymer.

Any method known to a person skilled in the art for preparing a mixture can be employed to prepare the mixture of the invention. For example, an intimate mixture can be prepared of granules of thermoplastic polymer and additive A, or a mixture of granules of thermoplastic polymer and granules of additive A. The thermoplastic polymer may also be in the form of granules, which are coated by the additive. Additive A can be introduced into the thermoplastic polymer during the polymerization process, advantageously at the end of polymerization. It is also possible to introduce additive A into the polymer in the molten state.

Step a) consists in preparing the mixture in the molten state, with stirring.

This step is advantageously carried out in any mixing device compatible with the pressure and temperature conditions of the use of thermoplastic materials. Step a) is preferably carried out in an extruder, even more preferably in a twin-screw or multiscrew extruder.

The mixture can be prepared by a method described above, and then introduced into the extrusion device employed in step a). The mixture can be introduced in solid or liquid form, for example in the molten state.

The mixture may also be prepared in situ in the same extrusion device as the one employed in step a).

Stirring during step a) allows shearing of the composition and effective mixing of the thermoplastic polymer and the additive A. The shear energy applied is determined according to the type of products to be mixed and the desired particle size of the thermoplastic polymer.

Before being cooled in step b), the mixture may be extruded through a die to be shaped into strings, wire, film, in a conventional manner known to a person skilled in the art.

Step b) consists in cooling the mixture to solidify at least the thermoplastic polymer. This cooling can be carried out conventionally with the aid of air or water.

The step of disintegrating the thermoplastic polymer particles from the cooled mixture can be carried out by various methods.

Thus, a first method consists of the application of a mechanical force, such as friction, shear, twisting, required to cause said disintegration.

In another embodiment, the disintegration occurs instantaneously when the cooled mixture is introduced into a liquid such as water, for example.

In a further embodiment, the liquid is advantageously a solvent of additive A. Thus, it is possible to recover a large part of additive A, in order to be able to reuse it, for example. Furthermore, the thermoplastic polymer powder will comprise a smaller amount of impurities or additive A.

In other cases, it may be advantageous not to remove additive A, which remains present on the surface of the thermoplastic polymer particles, thereby modifying the surface properties of said particles.

Advantageously, steps b) and c) are carried out simultaneously. For example, a mixture can be introduced after extrusion through a die directly into a reactor comprising a solvent of additive A and a non-solvent of thermoplastic polymer.

The thermoplastic polymer particles are optionally isolated from the solvent/additive A solution. Said isolation can be obtained by any means for separating a solid phase in suspension from a liquid phase. Said isolation may consist, for example, of filtration, settling, centrifugation or atomization.

For an aqueous dispersion, for example, the isolation can be obtained for example by atomization to recover a powder comprising elementary particles equivalent in size to those present in the dispersion and/or aggregates of particles. These aggregates are generally easily redispersible in a medium such as water, or broken by the application of vibrations to the powder. Other means for removing the water or for recovering the powder can be used, such as filtration or centrifugation, followed by drying of the filter cake.

The thermoplastic polymer particles thus obtained can be washed and dried.

The inventive method is useful for obtaining particles having a controlled geometry, in particular by adjusting the stirring in step a), the types of compound A and/or B, the temperature and the concentration of the various components of the mixture.

The powder has an intraparticle porosity lower than 0.05 ml/g, preferably lower than 0.02 ml/g, in particular for pore sizes of 0.01 μm or higher.

The powder of the invention has a sphericity factor of between 0.8 and 1, preferably between 0.85 and 1, more preferably between 0.9 and 1.

The powder of the invention advantageously has a flowability of between 30 and 60. The flowability of the powder can be modified in particular by adding various additives, for example silica.

The powder of the invention may also have an apparent density of between 500 and 700 g/l and a packed density of between 550 and 800 g/l.

The compositions used according to the invention, and the articles obtained, may contain one or more additives or compounds selected from the group comprising mattifiers, heat stabilizers, light stabilizers, pigments, dyes, reinforcing fillers, in particular abrasive fillers, nucleating agents, and impact reinforcment agents. For example, mention can be made of titanium dioxide, zinc oxide, cerium oxide, silica or zinc sulfide, used as mattifiers and/or abrasives.

Production by selective fusion of layers is a method for producing articles that consists in depositing layers of materials in powder form, selectively melting a portion or a region of a layer, depositing a new layer of powder and again melting a portion of said layer, and continuing in this manner until the desired object is obtained. The selectivity of the portion of the layer to be melted is obtained for example by using absorbers, inhibitors, masks, or via the input of focused energy, such as a laser or electromagnetic beam, for example.

Sintering by the addition of layers is preferred, in particular rapid prototyping by sintering using a laser.

Rapid prototyping is a method used to obtain parts of complex shape without tools and without machining, from a three-dimensional image of the article to be produced, by sintering superimposed powder layers using a laser. General information about rapid prototyping by laser sintering is provided in U.S. Pat. No. 6,136,948 and applications WO96/06881 and US20040138363.

Machines for implementing these methods comprise a construction chamber on a production piston, surrounded on the left and right by two pistons feeding the powder, a laser, and means for spreading the powder, such as a roller. The chamber is generally maintained at constant temperature to avoid deformations.

For example, the powder is first spread in a uniform layer on the entire chamber, the laser then traces the 2D cross section on the powder surface, thereby sintering it. Masks may also be used. The production piston drops by the thickness of one layer while one of the powder feed pistons rises. A new powder layer is spread on the entire surface and the process is repeated until the part is completed. The part must then be removed carefully from the machine and cleansed of the unsintered powder surrounding it. Other machines are available, in which the powder is not fed from the bottom via pistons, but from the top. This method serves to save time because there is no need to stop producing parts to resupply the machine with powder.

Other production methods by layer additions' such as those described in WO 01/38061 and EP1015214 are also suitable. These two methods use infrared heating to melt the powder. The selectivity of the molten parts is obtained in the case of the first method by the use of inhibitors, and in the case of the second method by the use of a mask. Another method is described in application DE10311438. In this method, the energy for melting the polymer is supplied by a microwave generator and selectivity is obtained by using a susceptor.

A specific language is used in the description to facilitate the understanding of the principle of the invention. It must nevertheless be understood that no limitation of the scope of the invention is intended by the use of this specific language. Modifications and improvements can be considered in particular by a person familiar with the technical field concerned on the basis of his own general knowledge.

The term and/or includes the meanings and/or, and all other possible combinations of the elements associated with this term.

Other details or advantages of the invention will appear more clearly from the examples provided below exclusively for information.

EXPERIMENTAL SECTION

Example 1

Powder Production

The following materials are used:
Polymer P: PA 6 TechnylStar® sold by Rhodia having a relative viscosity of 2.14 in sulfuric acid.
Additive A: Pluronic F108 sold by BASF
Compound B: Masterbatch of polymer P with 0.5% by weight of $TiO_2$ sold by BASF (grade PC1N).

In a Prism 24D double screw extruder, sold by Thermo Electron Corporation, compound B is introduced using a volumetric feeder and additive A is introduced in the form of pellets using a weight feeder. The flow rates of the two proportioners are adjusted to have an additive A concentration of 30% by weight. The mixture is extruded at a fixed rate of 8 kg/h. The temperatures of the various areas of the extruder are between 219 and 245° C. The speed is set at 390 rpm.

The strings obtained are dispersed in water by intense mechanical stirring: the solution is placed in a dispersion in a stirred tank (using a colloidal grinder sold by Fryma). The aqueous solution is then caused to settle with pumping of the foam and supernatant and is then filtered on a flat filter under vacuum to remove additive A and the solid impurities. A thermal stabilizer is added to the washed strings.

The slurry is then spray-dried by atomization. The atomizers used are the Niro Major for example 1 and the APV anhydro for example 2, sold by Niro and APV respectively. 0.1% by weight of silica T365, sold by Rhodia, is added to promote flowability. Sieving is carried out with a 100 micron sieve. The particle size distribution is measured using a MasterSizer 2000 instrument sold by Malvern Instruments. This distribution, expressed by volume, obtained after the application of ultrasound, is unimodal and centered on a particle diameter of 50 microns.

The characteristics of the particles obtained are as follows:

|  | Powder 1 | Powder 2 |
| --- | --- | --- |
| Sphericity factor | 0.92 | 0.93 |
| Intraparticle porosity (for pore sizes >0.01 μm to 1 μm) | <0.02 ml/g | <0.02 ml/g |
| Specific surface area (for pore sizes >0.01 μm) | 1.7 m$^2$/g | 2.4 m$^2$/g |
| Particle size distribution D50 | 55 μm | 50 μm |
| Particle size distribution (D90 − D10)/D50 | 0.94 | 1.06 |
| Apparent density | 640 g/l | 605 g/l |
| Packed density | 714 g/l | 694 g/l |
| Flowability | 46 | 58 |

Example 2

Production of an Article by Laser Sintering

The particles of example 1 are then sintered on a laser prototyping machine sold by EOS, model 360. The particles are placed in two adjacent trays on the working surface and heated to a temperature of 160° C. The particles are transferred to the working surface using a roller in 100-150 micron layers. The working surface is heated to a temperature between 195 and 200° C. A 25 W power laser provides the additional energy required for sintering the particles.

Once the first layer has been sintered, the working surface is lowered and the roller then deposits a second powder layer on the working surface, and this process is repeated until the final article is obtained. Test specimens were prepared without difficulty by this method of manufacture.

The measured density is between 1.129 and 1.137. The theoretical density is 1.143.

This provides a demonstration of the production of articles by laser sintering having a density and mechanical properties that are virtually equivalent to the same articles produced by injection molding.

The invention claimed is:

1. A method for manufacturing an article, the method comprising selectively fusing thermoplastic polymer powder layers, wherein the layers have the following characteristics:
   a d50 particle size distribution of between 20 and 100 μm, and also satisfying the following equation: (d90−d10)/d50 between 0.85 and 1.2;
   a sphericity factor of between 0.8 and 1; and
   an intraparticle porosity lower than 0.05 ml/g;
   wherein said article possesses a density having a range of 98.8% to 99.5% of theoretical density.

2. The method as claimed in claim 1, wherein the powder is manufactured by:
   a) mixing a molten thermoplastic polymer with a compound A comprising a polymeric material wherein at least pert of compound A's chemical structure is compatible with the thermoplastic polymer and at least part of compound A's chemical structure is incompatible and insoluble in the thermoplastic polymer, to obtain a mixture comprising a dispersion of discrete particles of thermoplastic polymer;
   b) cooling the mixture to a temperature lower than a softening point of the thermoplastic polymer, and
   c) treating the cooled mixture to make the particles of thermoplastic polymer disintegrate.

3. The method as claimed in claim 1, wherein the thermoplastic polymer is a polyolefin.

4. The method as claimed in claim 1, wherein the thermoplastic polymer is selected from the group consisting of nylon 6, nylon 6-6, mixtures thereof and copolymers thereof.

5. The method as claimed in claim 1, wherein the powder has a sphericity factor of between 0.9 and 1.

6. The method as claimed in claim 1, wherein the powder has a d50 particle size distribution of between 30 μm and 70 μm.

7. The method as claimed in claim 1, wherein the powder has a (d90−d10)/d50 particle size distribution of between 0.9 and 1.2.

8. The method as claimed in claim 1, wherein the powder has an intraparticle porosity lower than 0.02 ml/g.

9. The method as claimed in claim 1, wherein the powder has a flowability of between 30 and 60, as determined by standard shear testing technique for particulate solids using a Jenike shear cell.

10. The method as claimed in claim 1, wherein the powder has an apparent density of between 500 g/l and 700 g/l and a packed density of between 550 g/l and 800 g/l.

11. The method as claimed in claim 1, wherein the article comprises one or more additives or compounds selected from the group consisting of a mattifier, a heat stabilizer, a light stabilizer, a pigment, a dye, a reinforcing filler, a nucleating agent, and an impact reinforcement agent.

12. The method as claimed in claim 1, wherein the method for manufacturing the article by selectively fusing layers is a method for rapid prototyping by sintering using a laser.

13. The method as claimed in claim 3, wherein the polyolefin is selected from the group consisting of a polyethylene, a polypropylene, a polyvinyl chloride, a polyethylene terephthalate, a polystyrene, a polyamide and an acrylic.

14. The method as claimed in claim 11, wherein the reinforcing filler is an abrasive filler.

* * * * *